United States Patent
Okuda et al.

(10) Patent No.: US 7,583,832 B2
(45) Date of Patent: Sep. 1, 2009

(54) METHOD AND ITS APPARATUS FOR CLASSIFYING DEFECTS

(75) Inventors: Hirohito Okuda, Yokohama (JP); Toshifumi Honda, Yokohama (JP); Yuji Takagi, Yokohama (JP); Atsushi Miyamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 602 days.

(21) Appl. No.: 10/378,016

(22) Filed: Feb. 28, 2003

(65) Prior Publication Data

US 2004/0028276 A1 Feb. 12, 2004

(30) Foreign Application Priority Data

Aug. 12, 2002 (JP) ............... 2002-234302

(51) Int. Cl.
G06K 9/00 (2006.01)
G06K 9/62 (2006.01)
H04N 9/47 (2006.01)

(52) U.S. Cl. ............... 382/141; 382/155; 382/224; 348/91; 348/125

(58) Field of Classification Search ......... 382/141–152, 382/155–161, 224–228; 348/61, 86, 91, 348/92, 125–134, 87
See application file for complete search history.

(56) References Cited

U.S. PATENT DOCUMENTS

| 4,805,224 A | * | 2/1989 | Koezuka et al. | 382/141 |
|---|---|---|---|---|
| 5,544,256 A | * | 8/1996 | Brecher et al. | 382/149 |
| 5,640,200 A | * | 6/1997 | Michael | 348/87 |
| 5,694,481 A | * | 12/1997 | Lam et al. | 382/145 |
| 5,796,410 A | * | 8/1998 | Baird | 345/471 |
| 6,148,099 A | * | 11/2000 | Lee et al. | 382/149 |
| 6,922,482 B1 | * | 7/2005 | Ben-Porath | 382/149 |
| 6,968,079 B2 | * | 11/2005 | Yoshikawa et al. | 382/145 |
| 6,987,873 B1 | * | 1/2006 | Ben-Porath et al. | 382/145 |
| 2002/0057831 A1 | * | 5/2002 | Hiroi et al. | 382/149 |

FOREIGN PATENT DOCUMENTS

JP 2001-135692 5/2001

(Continued)

OTHER PUBLICATIONS

Chou, Paul B., A. Ravishankar Rao, Martin C. Sturzenbecker, Frederick Y. Wu, and Virginia H. Breecher. "Automatic Defect Classification for Semiconductor Manufacturing". Machine Vision and Applications: 1997. pp. 201-213.*

(Continued)

Primary Examiner—Daniel G Mariam
Assistant Examiner—Manav Seth
(74) Attorney, Agent, or Firm—Townsend and Townsend and Crew LLP

(57) ABSTRACT

A highly reliable defect automatic classifying method and apparatus capable of flexibly coping with a request for classifying a defect given by each user without having to collect lots of teach data items. A classifying class arrangement is defined by a user by combining classes supplied by the system itself or classes defined by the user and, further, a priori knowledge on the defect class is given by the user as a restriction so as to carry out restricted learning.

14 Claims, 13 Drawing Sheets

FOREIGN PATENT DOCUMENTS

JP       2001-256480 A    9/2001

OTHER PUBLICATIONS

Sherman, Rivi and Ehud Tirosh. "An Automatic Defect Classification System for Semiconductor Wafers". Machine Vision Applications in Industrial Inspection: 1993. SPIE vol. 1907. pp. 72-78.*

Breaux, Louis and Baljit Singh. "Automatic Defect Classification System for Patterned Semiconductor Wafers". 1995 International Symposium on Semiconductor Manufacturing. pp. 68-73.*

* cited by examiner

CLASS ARRANGEMENT TEACH SCREEN

EXAMPLE 1

EXAMPLE 2

EXAMPLE 3

81

82

FIG. 13A
GROUP OF BUILT-IN TEACH DATA
| →CLASSIFICATION | FOREIGN MATTER/ CONCAVE/PATTERN | LARGE/ SMALL | ON FILM/ UNDER FILM |
|---|---|---|---|
| ① | | FOREIGN MATTER | LARGE | ON FILM |
| ② | | FOREIGN MATTER | SMALL | ON FILM |
| ③ | | FOREIGN MATTER | LARGE | UNDER FILM |
| ④ | | FOREIGN MATTER | SMALL | UNDER FILM |
| ⑤ | | CONCAVE | LARGE | — |
| ⑥ | | PATTERN | SMALL | — |
1301
FIG. 13B
EXAMPLE 1
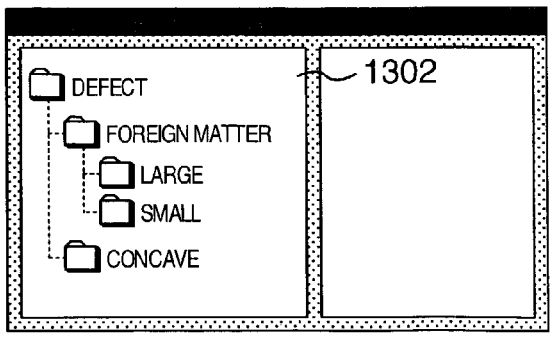
1302
FIG. 13C
EXAMPLE 2
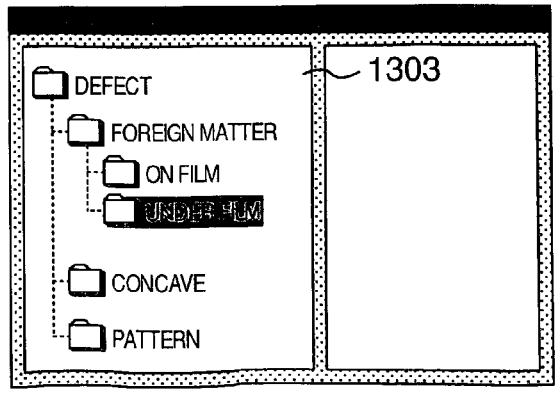
1303

METHOD AND ITS APPARATUS FOR CLASSIFYING DEFECTS

BACKGROUND OF THE INVENTION

The present invention relates to a method and its apparatus for classifying defects. In particular, the present invention relates to the method and its apparatus for classifying defects occurring on the surfaces of a semiconductor electronic circuit substrate, a printed circuit substrate, a liquid crystal display substrate, and so forth based on a detected image, an EDX detection spectrum, and so forth.

In recent years, a method for automatically classifying an image of a defective portion has been developed for the purpose of quickly grasping the status of defects occurring on the surface of a semiconductor electronic circuit substrate or the like or for the purpose of monitoring the number of occurrences of defects for each defect type.

As the method for automatically classifying the image, various kinds of methods have been long studied in the field of pattern recognition.

One of the classical methods is a method called a learning classification. This method takes the steps of collecting teach images in advance and optimizing a classifier (neural network or the like) by learning the teach images. The learning classifier provides for a capability of flexibly classifying the image in response to a user's request, while disadvantageously it cannot be practical in starting a production process because ordinarily a massive amount of teaching data is required to be collected for obtaining an excellent performance. Conversely, in the case of using only a small amount of teaching data, the phenomenon of excessively adapting the learning to teaching data, called an excess learning, takes place. This phenomenon lowers the performance of the learning classifier.

Another classical method is a method called a rule-based classification. This method takes the steps of extracting a feature amount from a target image to be classified, determining a value of the feature amount based on the "if-then" rule built in the system, and classifying a defect into a proper one of the classes based on the feature amount value. The rule-based classifier is not able to flexibly respond to the user's request because the class rules for classification are fixed, while advantageously it can be used in starting the production process because no teaching data is necessary.

Further, JP-A-2001-135692 discloses a hybrid invariant adpative, automatic defect classification method for automatically classifying defects through the use of the combination of the foregoing rule-based classifier with the learning classifier. That is, in the technology disclosed in this publication, the rule-based classifier called a "core classifier" serves to classify a defect to a class having a fixed number built in advance (called "core classification"), and then the learning classifier called the "specific applicable classifier" related with the core classification serves to classify the defect into the "lower class" that may be divided by an optional number.

In the technology described in the foregoing publication, the use of the core classifier is said to make it possible to perform the core classification in the start-up of the process without having to collecting teach data items. Further, if more detailed classification is required, the learning type "specific applicable classifier" may be used for the classification.

However, the foregoing rule-based classifier and the methodology having the rule-based classifier built as its part, for example, the invention disclosed in the foregoing publication is restricted by the facts that the rule is fixed and that the class is also fixed. In the following, these restrictions will be described.

(1) Restriction by the Fixed Rule

In the rule-based classifier, the classifying rules built in advance has been made to correspond to the classifying classes. This may be an obstacle to realizing a high classifying performance. In actual, as to the classification into the classes for the "core classification" such as "particles" and "pattern defects", the rule-based classifier has difficulty in realizing a high classifying performance to an ordinary user or a general process. This results from the fact that a certain class and the qualitative quality observed from an image of the defect belonging to the class are slightly (sometimes, largely) different in each user, that is, they are not invariant.

For example, the restriction will be described with reference to two classes of "particle defect" and "pattern defect". As an example, for a user A, the "particle defect" is observed as having "a projecting geometry and an arbitrary area" and the "pattern defect" is observed as having "a tabular geometry and an arbitrary area", while for a user B, the "particle defect" is observed as having "a projecting geometry or a tabular geometry and a small area" and the "pattern defect" is observed as having "a tabular geometry and a large area". In this case, for the user A, whether or not it has a projecting geometry is an effective feature to identify the defect, while for the user B, not whether or not it has a projecting geometry but whether or not the area is small is an effective feature to identify the defect. Obviously, there are no common classifying rules that look at the projecting state or the area, based on which rules the "particle defect" and the "pattern defect" are distinctively classified.

That is, even for a highly general-purpose class which many users require, there is, in general, no invariable classifying rule that corresponds to the class. Being a highly general-purpose class and whether or not it is possible to classify the class by means of the rule-based classifier are a matter of entirely different problem.

(2) Restriction by the Fixed Class

The rule-based classifier includes the classes to be classified as built ones. Hence, it may not supply the user with the classes that meet with the user's request.

For example, in the technology disclosed in the foregoing publication, it is a presupposition that the rule-based classifier divides defects into the "particle" and the "pattern". However, no substantial "pattern" defect takes place in a certain user's process. In this case, only the "particle" defect is enough. If the excess class is built as a rule, for the user, there may take place a disadvantage of lowering the performance by the originally unnecessary erroneous classification into the class.

In the technology described in the publication, the rule-based classifier further sub-divides the "particles" into "particle and transformed pattern", "particle on the surface", and "buried particle". In some cases, this kind of sub-divisions may be unnecessary to the user. Or, a case may arise where since the high enough performance to the target process cannot be achieved, the sub-division is rather to be abolished.

Further, the criterion of sub-division may be required to be changed. That is, in place of subdividing the "particles" into the "particle and transformed pattern", the "particle on the surface", and the "buried particle", the particles may be sub-divided according to the criteria of "large" and "small". For the same reason, in some cases, it may be preferable to partially combine the classes or further sub-divide the classes.

As described above, since the classifying classes are built in advance, the rule-based classifier may supply the user with an unnecessary class, sub-divide the defects excessively, and impose a specific classifying criterion on the user. As a result, in some cases, the classification that meets the user's request cannot be often realized. Moreover, it may entail a degradation in performance.

As described above, disadvantageously, the conventional rule-based classifier or the methodology that has the rule-based classifier therein as a part may not be able to perform the classification or experience a degraded classifying performance if the nature of the data belonging to each class is different from user to user, because the classifying rule for each class is built in advance. Further, since the classifying class provided by the rule-based classifier is built in advance, the classifying classes that are just sufficient, not too much and not too little, to the user's request may not be provided. Further, the erroneous classification caused thereby may result in a disadvantageous lowering of the performance.

The methodology of the classification in the technology described in the foregoing publication, that is, the concept that classification is made into a predetermined number of "core classifications" through the use of the rule-based classifier, is based on the presupposition that there always exists a "core classification" like a "common class" that would meet the request by any user and the "common class" like "core classification" is executed on the common invariant classifying rule.

However, as described above, in actual, there exists no such class that could become a "common class" to the classification requested by any user. Further, even if there existed such a class that might become a "common class" to the classification requested by the most of the users, it is, in general, difficult to perform the classification based on the common invariant classifying rule.

SUMMARY OF THE INVENTION

It is an object of the present invention to provide a method and its apparatus for classifying defects which are arranged to lower the adverse effect of the excess learning involved in the conventional learning classifier and to solve the problem of the conventional rule-based classifier, that is, the classification that meets the user's request cannot be realized.

The method according to the invention for classifying the defects comprises the steps of imaging a sample or specimen for obtaining an image of the sample; extracting a defect image of the sample by comparing the image of this sample with a reference image; associating this extracted defect image with a plurality of classes into which the defect image is to be classified; storing information on the associating relation; specifying a restricting condition for classifying the defect image into the classes; classifying the extracted defect image into the classes through the use of the stored information on the associating relation and the specified restricting condition; and displaying the classified defect image on a screen.

Specifically, the foregoing method for classing defects according to the invention is arranged to lower the adverse effect of the excess learning involved in the learning classifier for the purpose of performing the learning under the restricting condition specified by the user and solve the problems involved in the foregoing conventional rule-based classifier or the method having the rule-based classifier as its part for the purpose of determining the definitions of the classes and the classifying rules for the classes.

These and other objects, features and advantages of the invention will be apparent from the following more particular description of preferred embodiments of the invention, as illustrated in the accompanying drawings.

BRIEF DESCRIPTION OF THE DRAWINGS

FIGS. 13A to 13C are views for explaining automatic adaptation of a classifier according to the fourth embodiment of the present invention;

DESCRIPTION OF THE EMBODIMENTS

Description will now be made to a first embodiment of the present invention.

A first embodiment adopts an arrangement called a restricted learning classifier. The restricted learning classifier is a methodology by which a user defines a class arrangement, specifies the nature or character of the classifying rule for each class as a restricting condition and then performs a learning operation under the restriction specified by the user.

The classifying method of the present invention is different from the conventional rule-based classifier or classifier having the rule-based classifier therein as its part in the respect that the inventive method uses a learning classifier whose class arrangement may be freely specified by the user, that is, the system itself supplies no built-in class nor classifying rule corresponding to the class.

At the same time, the classifying method of the present invention is different from the classical learning classifier in the respect that the character of a border on which the classes are separated from each other is specified as a restriction by the user. Imposing the specified restriction allows a degree of flexibility in learning to be lower, thereby reducing the "excess learning", that is, a phenomenon of excessively adapting to the teach data.

In general, it is difficult to automatically determine the validity of the degree of freedom of a model in the classical learning classifier. In other words, it is difficult to automatically determine if the degree of freedom in the model which is presupposed by the learning classifier is proper or not to the character or nature of the classifying problem to be solved. In contrast thereto, it can be safely said that the method according to the embodiment allows the user to directly specify the restriction on the degree of freedom of the model, thereby allowing the user to control the degree of freedom in the model according to the character or nature of the classifying problem.

Figure 1A:
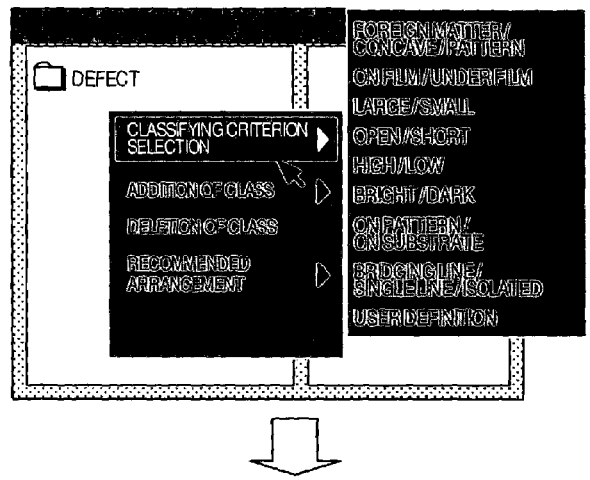
FIGS. 1A to 1D are elevation views showing a teach screen on which a class arrangement is specified.
Figure 1B:
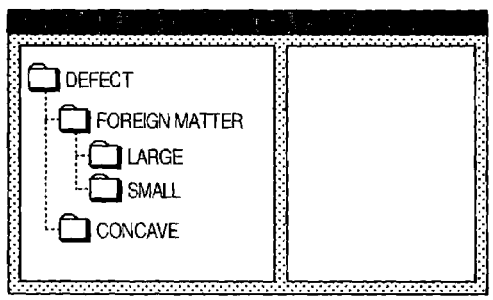
Figure 1C:
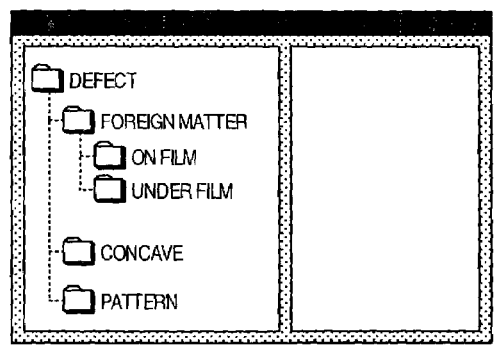
Figure 1D:
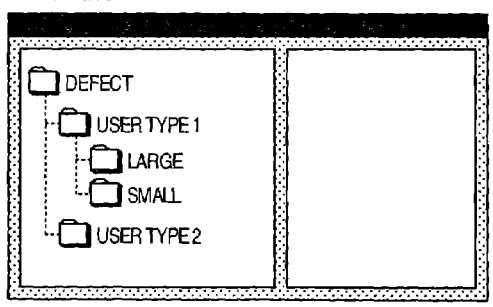
Figure 2A:
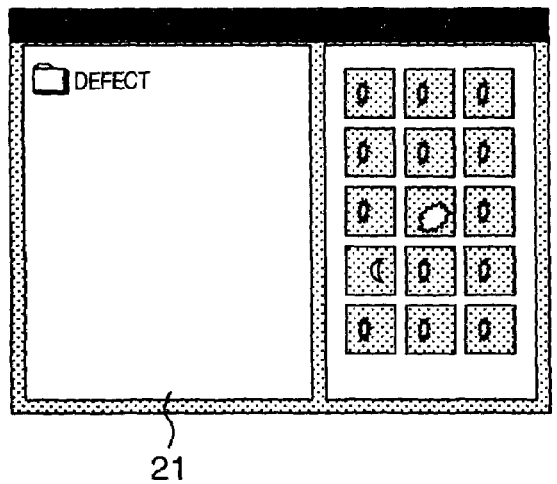
FIGS. 2A to 2C are elevation views showing a class arrangement specifying screen and a teach screen according to a first embodiment of the present invention.
Figure 2B:
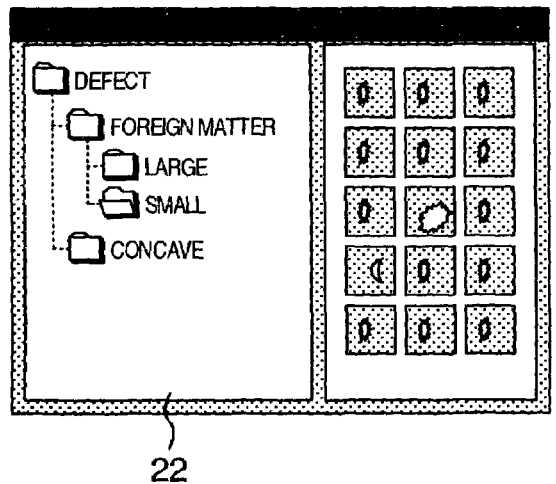

In the classifying method of the present invention, first, the user collects defect images. In FIG. 2A, reference number 21 indicates the state in which a list of the collected images are shown without being classified. Then, the user specifies the class arrangement for classifying the defects. The user can set an arbitrary class arrangement. In FIG. 2B, reference number 22 indicates an example of the class arrangement specified by the user. The user can freely name each class and combine the classes in series or in parallel, for specifying an arbitrary class arrangement. In the class arrangement indicated by reference number 22, the classes of a "foreign matter" and a "concave" are set in parallel and further the classes of "large" and "small" are set subordinately to the class of the "foreign matter".

Figure 2C:
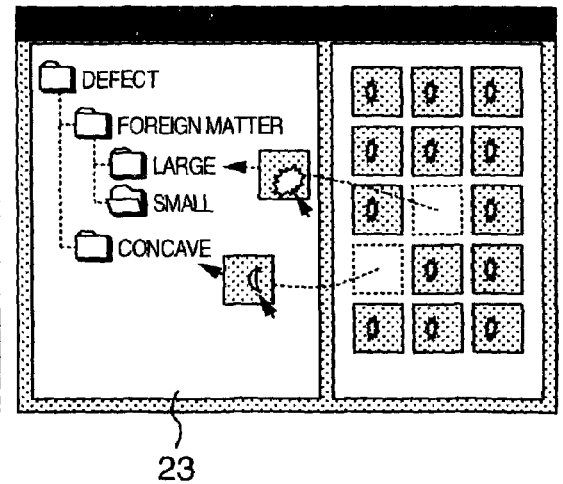

Next, the user caries out teaching. For example, as shown by 23 in FIG. 2C, the user teaches a proper class each classified defect image by a drag-and-drop operation.

Figure 3:
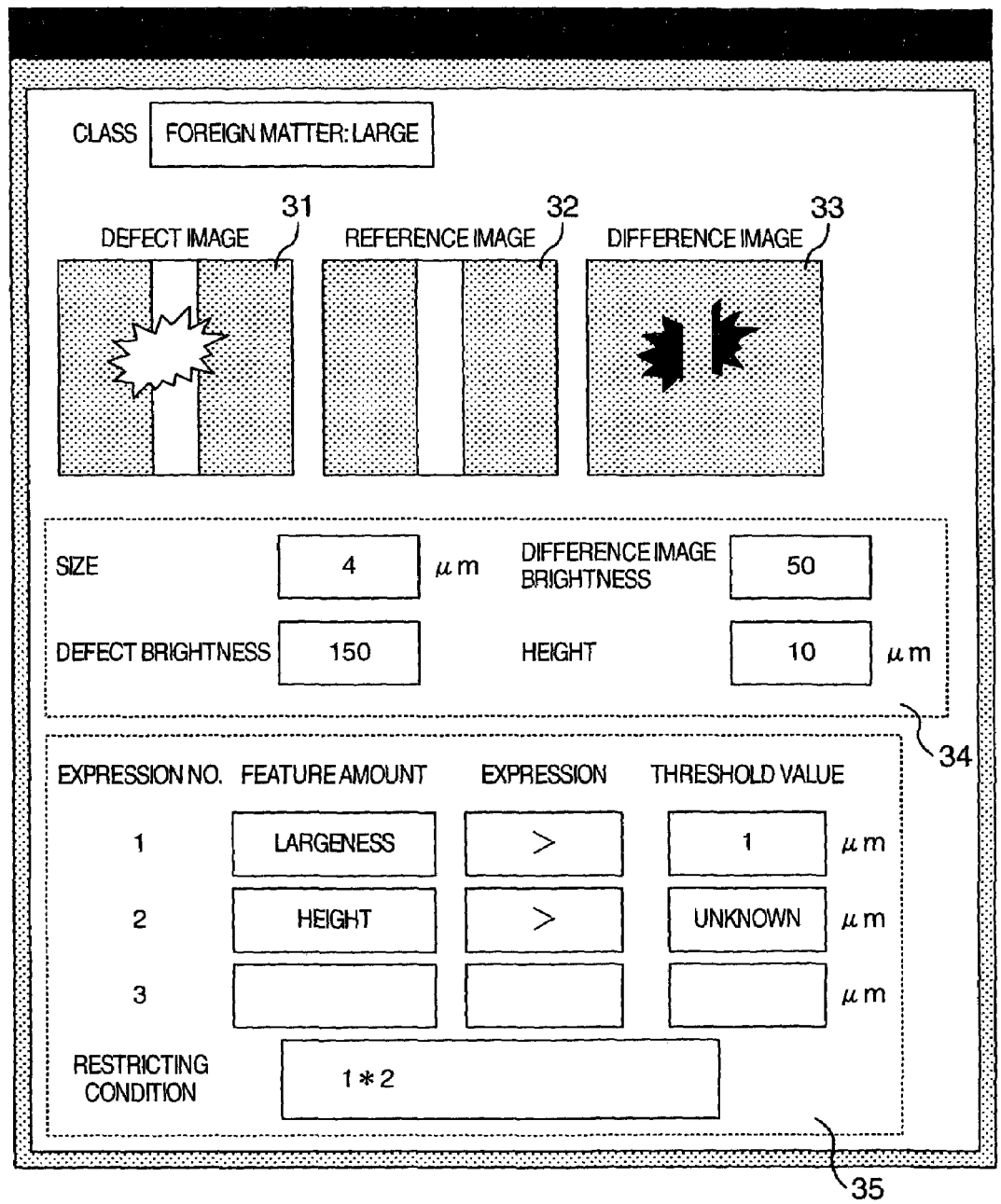
FIG. 3 is an elevation view showing a screen on which a restricting condition is specified in the first embodiment.

Then, the user specifies a restricting condition on the rule for classifying the defects into the classes. FIG. 3 shows a screen on which the restricting condition is specified on the rule for classifying the defects into the classes. Concretely, the screen shown in FIG. 3 concerns with the specifying operation in the class of the "foreign matter: large". The group of images denoted by 31 to 33 are the detected images that indicate a defect image, a reference image, and an extracted defect area, respectively. Reference number 34 denotes features of a defect obtained by analyzing a defect area. For example, the features include the feature amounts of size (dimension), brightness and height.

In the case where the character or nature of a defect can be specified on the basis of the experience and the knowledge by observing the detected image and referring to the calculated feature amounts, the user enters the character of the defect from an input section 35. In the example shown in FIG. 3, the restricting condition is defined based on two expressions. That is, the expression NO. 1 is defined as "the defect is greater than a constant value (1 μm) in size". The expression NO. 2 is defined as "the defect is greater than a constant value (unknown threshold) in height". Then, the meeting of NO. 1 and NO. 2 (1*2) is specified as a restricting condition.

The expressions are made by specifying (1) a type of feature amount (such as size, height and so on), (2) a type of expression (such as "greater than", "smaller than", "equal to" and so on), and (3) presence or absence of a threshold value.

The restricting condition is defined as a combination of the foregoing defined expressions by a logical operation (for example, "expression NO. 1 and expression NO. 2).

Figure 4A:
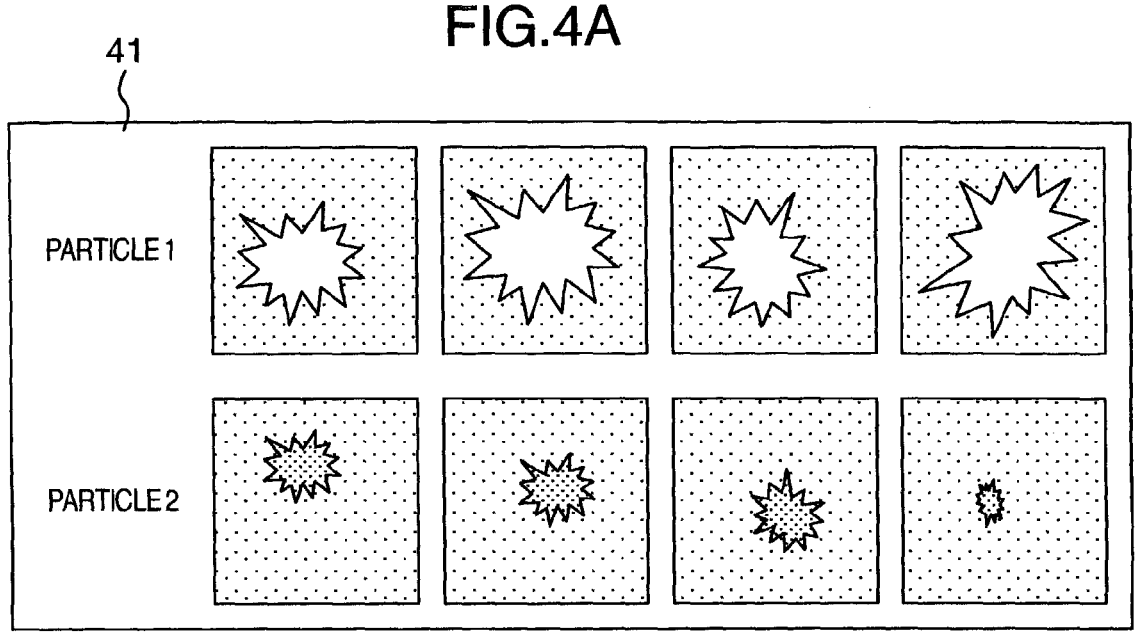
FIGS. 4A to 4C are explanatory views showing a concrete example of the effect executed by the restricted learning.
Figure 4B:
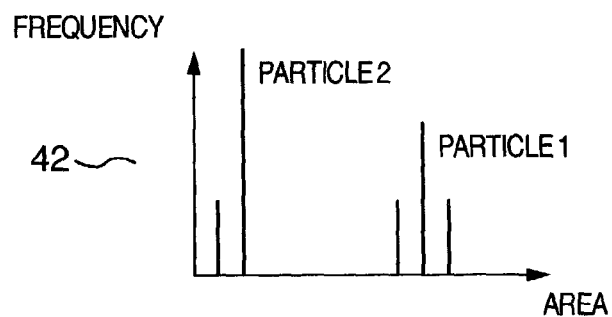
Figure 4C:
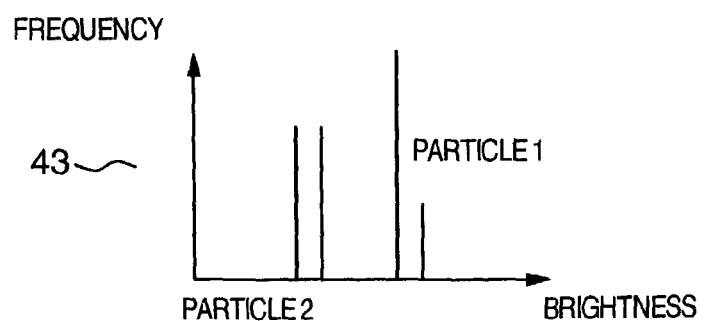

In the restricted learning classifier, the excess learning occurring in the ordinary learning classifier may be avoided. This will be described with reference to another example. It is assumed that the teach data group of a "particle 1" and a "particle 2" is obtained as indicated by 41 in FIG. 4A. All the defects in the teach data group of the "particle 1" are characterized as "large area" and "white", while all the defects in the teach data group of the "particle 2" are characterized as "small area" and "gray". 42 in FIGS. 4B and 43 in FIG. 4C show distribution histograms of the feature amount of the teach data. Assuming that defects each with a large area happen to be collected in the teach data of the "particle 1", it is not preferable to determine that the "area" is an effective feature in identifying the defect. Ordinarily, in the learning classifier with no restriction, the "area" is determined to be an effective feature in identifying the "particle 1" and the "particle 2". That is, the excess learning takes place.

However, in the case where the user can determine, based on a priori knowledge, that the large areas of the "particle 1" in the teach data is just accidental, that is, such is attributable to biased teach data, the user may specify on the screen shown in FIG. 3 the restriction that the feature of the "area" is not used, how much of the range the "area" is distributed or the like. This restriction allows the excess learning to be lowered.

Figure 5:
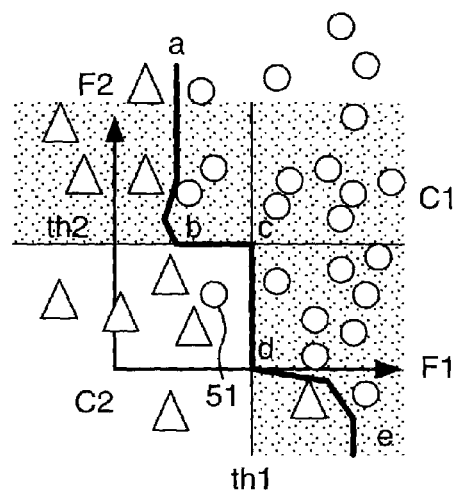
FIG. 5 is a view showing a spatial distribution of feature amounts of defects, for explaining an example of the restricted learning.

FIG. 5 shows an example of learning a border of separating the classes from each other in the feature amount space by means of the restricted learning. FIG. 5 shows a border a-b-c-d-e for separating two classes of C1 and C2 from each other, which is learned by the most neighborhood method in the two-dimensional feature amount space consisting of two axes of F1 and F2 under the following restricting condition to be specified by the user.

The restricting condition: The existing range of the class C1 meets F1>th1 or F2>th2.

In FIG. 5, the feature amount vector belonging to each class of C1 or C2 is indicated by a circle or a triangle. Under the restricting condition, the border of the class C1 is limited to the gray portion.

On the other hand, the nearest neighborhood method (1—nearest neighborhood method in this embodiment) is executed so that any point in the feature amount space is classified into a class belonging to the teach data closest to that point. Hence, the coverage range of the class C1 defined by the most neighborhood method and the area defined by the foregoing restricting condition are defined as an area classified as the class C1. As a result, the border a-b-c-d-e between the classes C1 and C2 consists of a portion (section a to b and section d to e) defined by the most neighborhood method and a portion (section b to d) defined by the restricting condition.

Consequently, as indicated by 51 in FIG. 5, the teach data existing in the area that does not meet the restricting condition is ignored. That is, the data which "accidentally creep in" and does not meet the user's a priori knowledge, is not used.

Another effect is that, if data indicated by 51 is regarded to be data from which a feature amount is failed to be calculated, the data is automatically discarded, to another disadvantage.

Now, the method for classifying the defects according to a class arrangement defined by the user through the use of the restricted learner (learning unit) will be described with reference to an example of the collected defect image 21 in FIG. 2A.

By the foregoing teach procedure and the GUI operation, the user teaches the teach data to each class of "large foreign matter", "small foreign matter", and "concave" and also specifies the restricting condition. This classifier generates the feature amount space to each hierarchical class (layer) of the class arrangement. That is, the classifier generates the first feature amount space for discriminating a foreign matter from a concave and the second feature amount space for discriminating a large foreign matter from a small foreign matter.

In the first feature amount space, all data taught as the "large foreign matter" and the "small foreign matter" are used as the teach data for the foreign matter to learn the border for separating two classes of the foreign matter and the concave. In the second feature amount space, the border for separating the two classes of the "large foreign matter" and the "small foreign matter" from each other is learned by using the data taught as the "large foreign matter" and the "small foreign matter".

In executing the classification, at first, the defect to be classified is classified into foreign matter or concave according to the learned result in the first feature amount space. Further, the defect classified as foreign matter is further classified into the "large foreign matter" or the "small foreign matter" according to the learned result in the second feature amount space.

Figure 15:
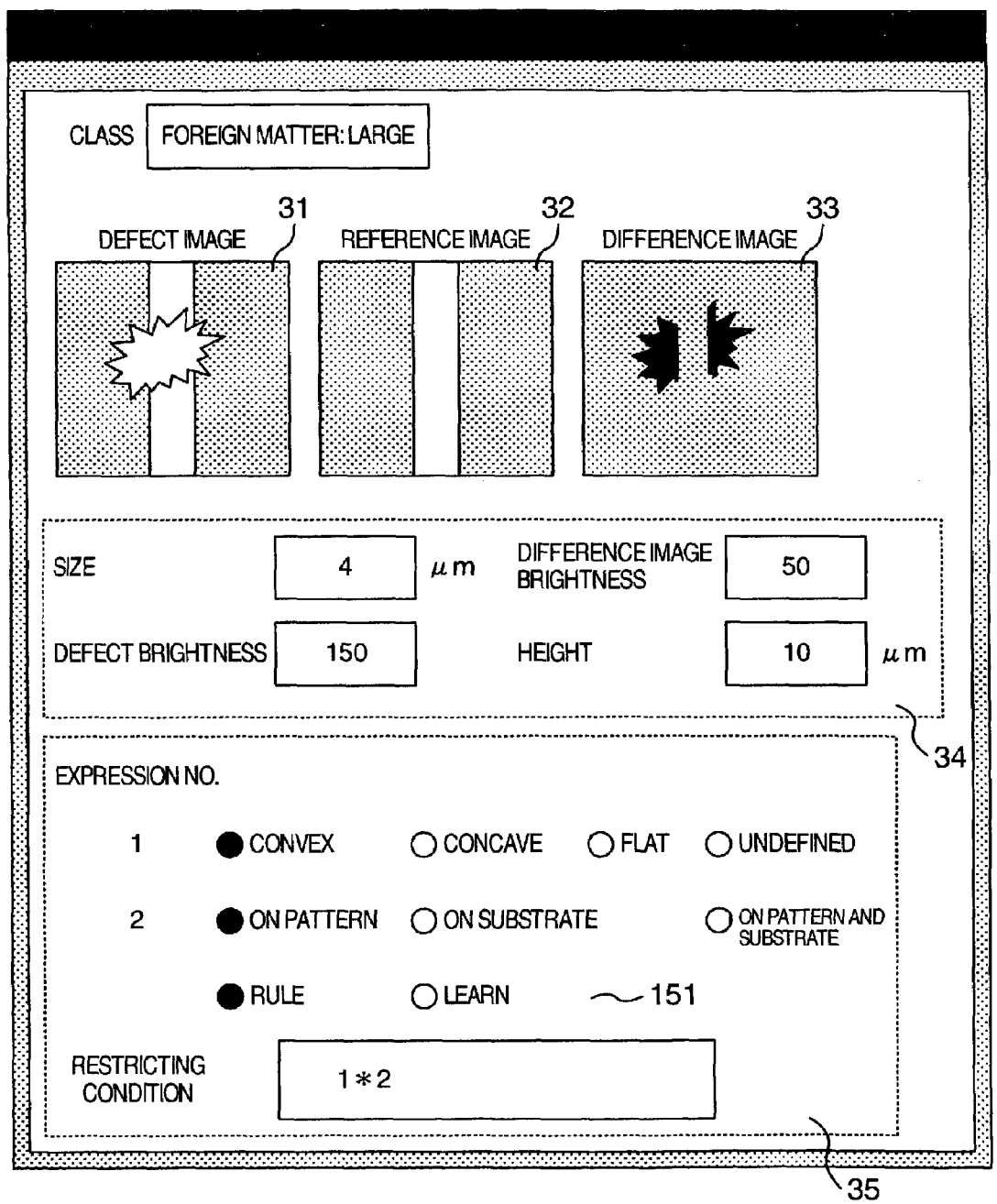
FIG. 15 is an elevation view showing a screen on which a restricting condition is specified in the first embodiment of the present invention.

The foregoing description has been concerned with the learning under the restricting condition. On the other hand, it is also conceivable that the restricting condition may be directly used as the condition of determining the class. This example is shown in FIG. 15. FIG. 15 shows an example of a screen on which the restricting condition is entered. On the screen shown in FIG. 15, the user specifies that the defect falls upon any one of:

Expression NO. 1: Convex, Concave, Flat, Undefined

Expression NO. 2: On pattern, On substrate, On pattern and substrate, as the restricting condition. Further, by the item indicated by 151, the user specifies that whether the restricting condition is directly used as the condition of determining the class (depressing the "rule" button) or the learning is executed under the restricting condition (depressing the "learning" button).

The system analyzes the defect area and calculates the information required for determining the expressions NO. 1 and NO. 2. Then, when the "rule" button indicated by 151 is depressed, the system executes the classification by directly using the restricting condition as the condition of determining the class, while when the "learning" button indicated by 151 is depressed, the system does the learning under the restricting condition by the foregoing method to execute the classification.

The foregoing description has concerned with the method of defining the class arrangement by the user according to the first embodiment, the method of supplying the teach data, the restricted leaner (learning unit), the realization of the classification of the defects into the user's defined classes by hierarchically arranging the learner with restriction condition, and the user interface screen for allowing the user to enter the restricting condition.

Now, description will be made to a second embodiment of the present invention. In this embodiment, as shown in FIGS. 1A to 1D, before classifying the defects, the user specifies the class arrangement for classifying the defects in accordance with the user interface. The user combines the class provided by the system with the class defined by the user for arranging the classes. At first, the process for specifying the class arrangement will be described. Then, the automatic adaptation of the classifier will be described.

(1) Process for Specifying the class Arrangement

FIGS. 6A-6C, 7A-7B, 8A-8B, 9A-9B and 10A-10B show the screen on which the class arrangement is to be specified and the specifying process. Hereafter, the operation of specifying the class arrangement will be described.

Operation 1: Selection of Classifying Criterion (FIGS. 6A-6B)

Figure 6A:
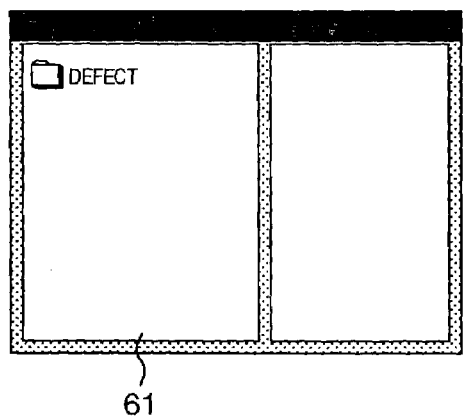
FIGS. 6A to 6C are elevation views showing a screen on which a class arrangement is specified, for explaining the procedure of specifying a class arrangement.

In the initial state, as shown by 61 in FIG. 6A, no class is defined. The classifying criterion to be used for classification by the user may be selected from the classifying criterion presented by the system. The following classifying criteria are available, for example.

Figure 6B:
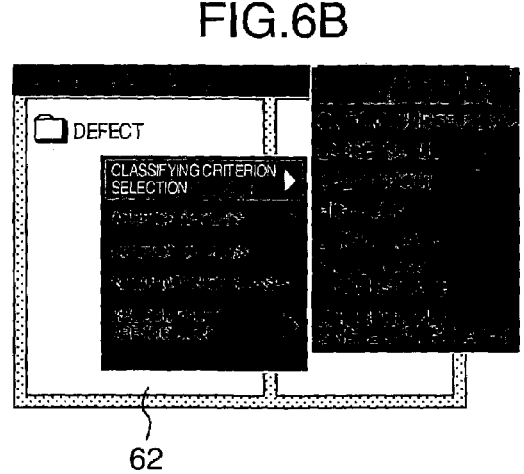
Figure 6C:
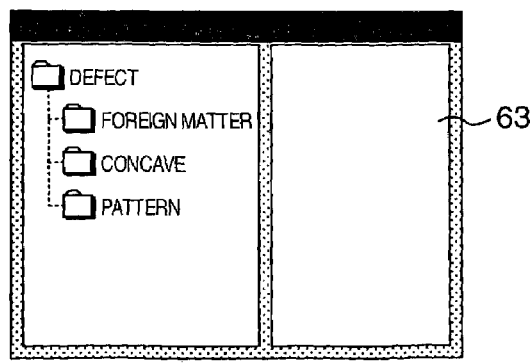

(a) Foreign Matter•Concave•Pattern
(b) Foreign Matter on Film•Foreign Matter under Film
(c) Pattern on Film•Pattern under Film
(d) Large•Small
(e) Pattern Open•Pattern Short•Others
(f) High•Low
(g) Bright•Dark
(h) On Pattern•On Substrate
(i) Bridging Line, Single Line, Isolated The operating process is, for example, such that the classifying criterion may be selected by the cursor operation as indicated by 62 in FIG. 6B. FIG. 6C shows the state in which the classifying criterion of Foreign matter•Concave•Pattern is selected.

Moreover, apart from the class presented by the system, the user may newly define a user class. Like the class presented by the system, the class defined by the user is to be handled by the following operations 2 to 5.

Figure 7A:
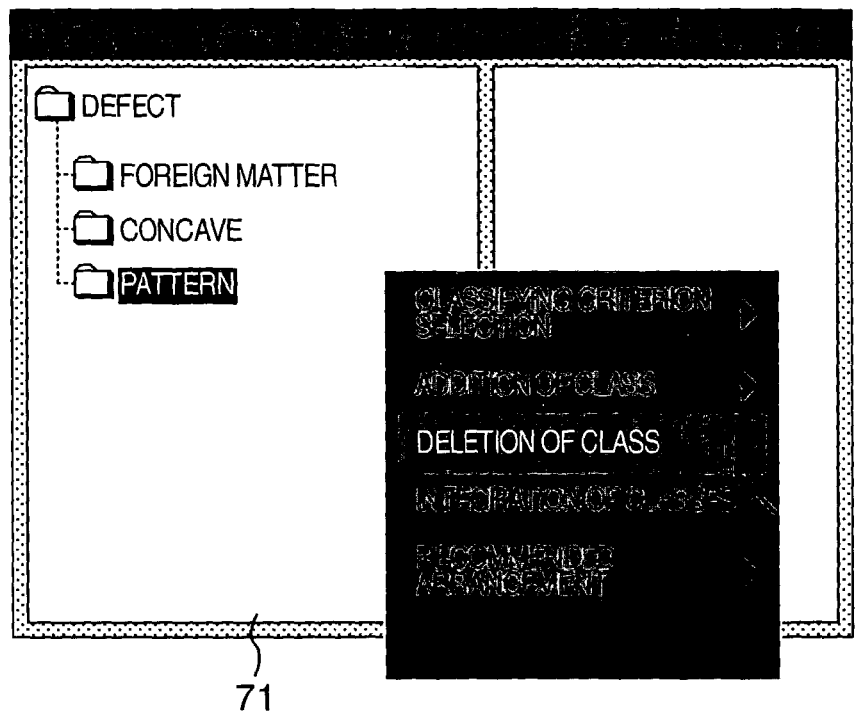
FIGS. 7A and 7B are elevation views showing a screen on which a class arrangement is specified, for explaining the procedure of deleting a class.
Figure 7B:
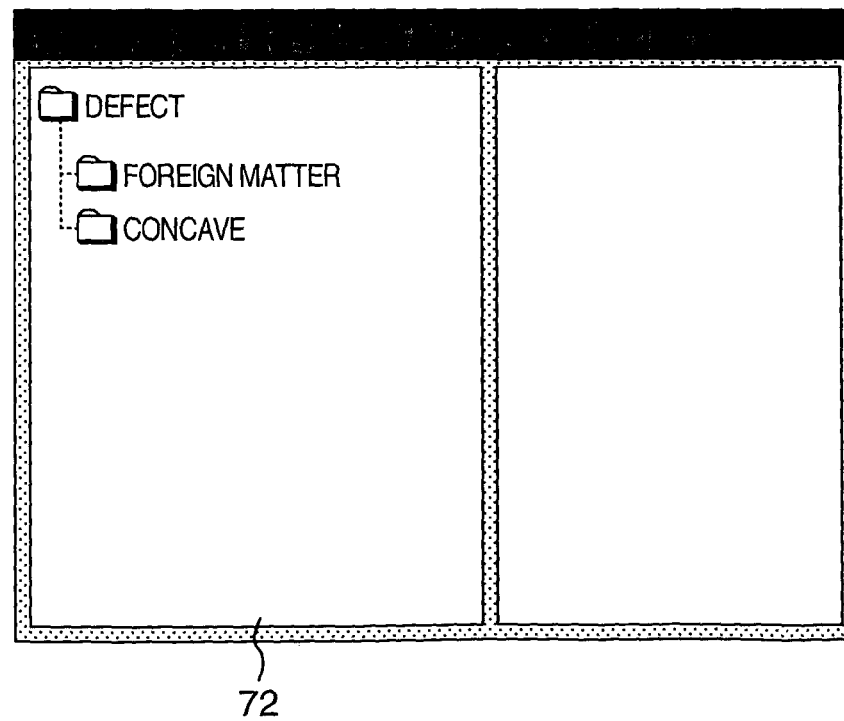

Operation 2: Deletion of Class (FIGS. 7A-7B)

The user may delete any class. The operating procedure is, for example, such that after selecting the class to be deleted, the user gets the operation panel to be displayed, and selects the delete operation as indicated by 71 in FIG. 7A. 72 shown in FIG. 7B shows the state in which the pattern defect is deleted from the class arrangement shown by 71 in FIG. 7A.

Figure 8A:
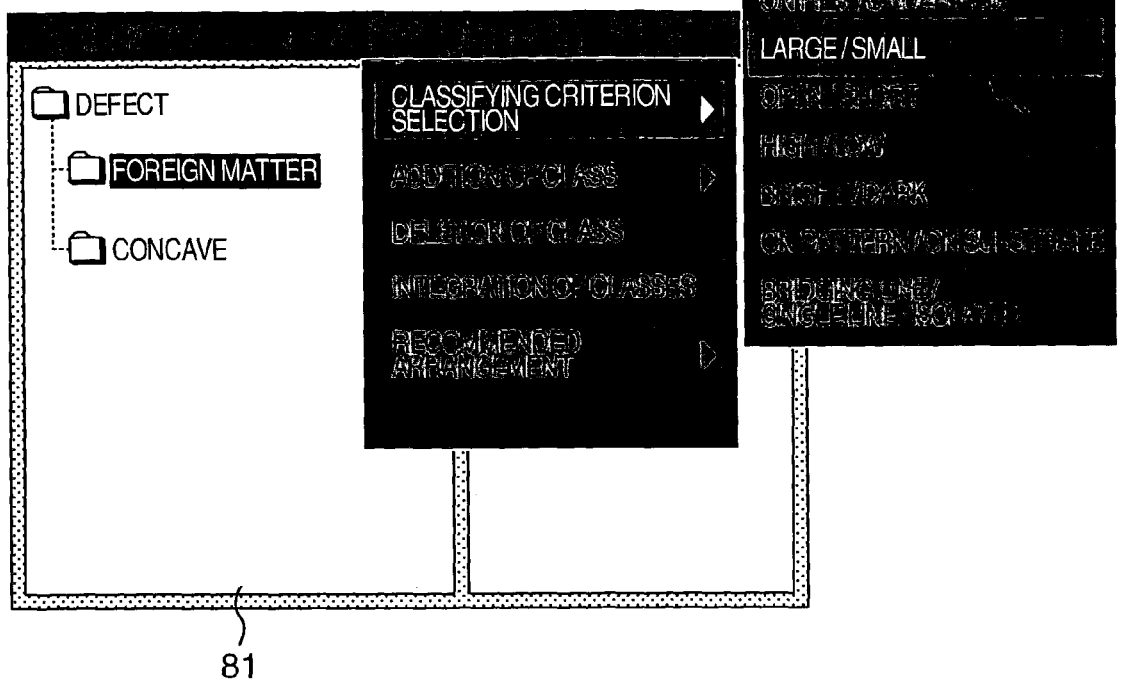
FIGS. 8A and 8B are elevation views showing a screen on which a class arrangement is specified, for explaining the procedure of defining a hierarchical relation to a class.
Figure 8B:
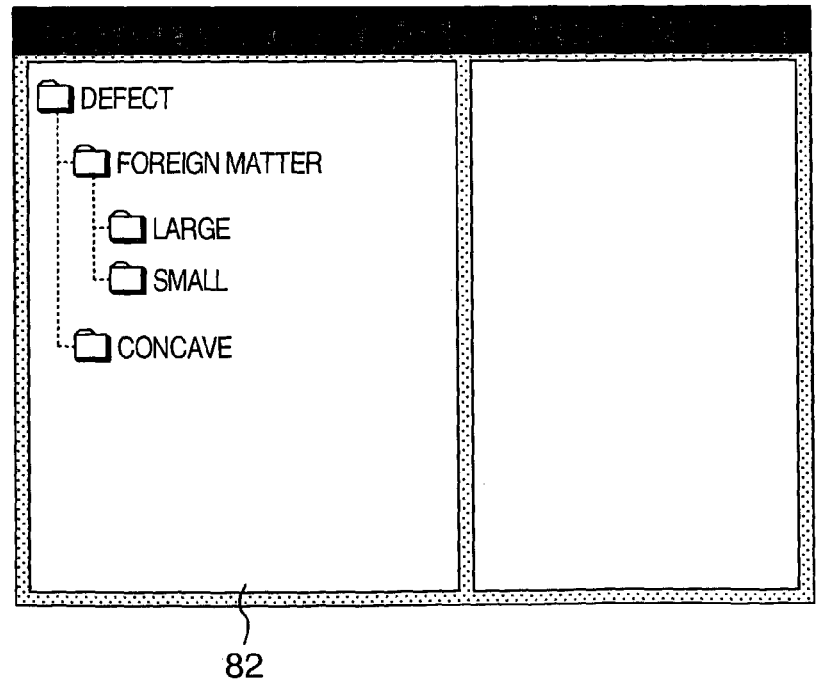

Operation 3: Definition of Class (FIGS. 8A-8B)

The user may define the class arrangement so as to subdivide a specific class according to other classifying criterion. For example, the "pattern" defect may be further sub-divided into "pattern open"•"pattern short"•"others". This kind of sub-division may be executed as required by the user. Alternatively, the "concave" defect may be further sub-divided into "deep" concave•"shallow" concave. This sub-division may be specified as required by the user. The operating procedure therefor is, for example, as indicated by 81 in FIG. 8A, such that after selecting the class to be sub-divided, the user may get the operation panel to be displayed, and then execute selection of the classifying criterion as described in connection with the operation 1. 82 in FIG. 8B shows the state in which the classifying criteria of "large" and "small" are set subordinately to the "foreign matter".

Figure 9A:
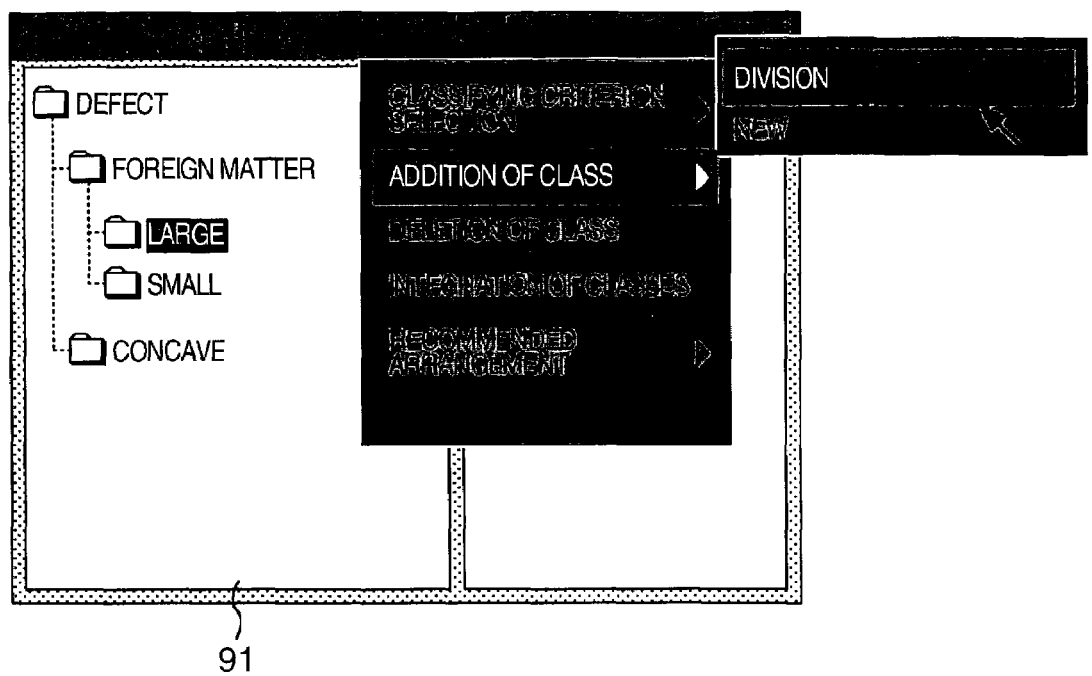
FIGS. 9A and 9B are elevation views showing a screen on which a class arrangement is specified, for explaining the procedure of dividing a class.
Figure 9B:
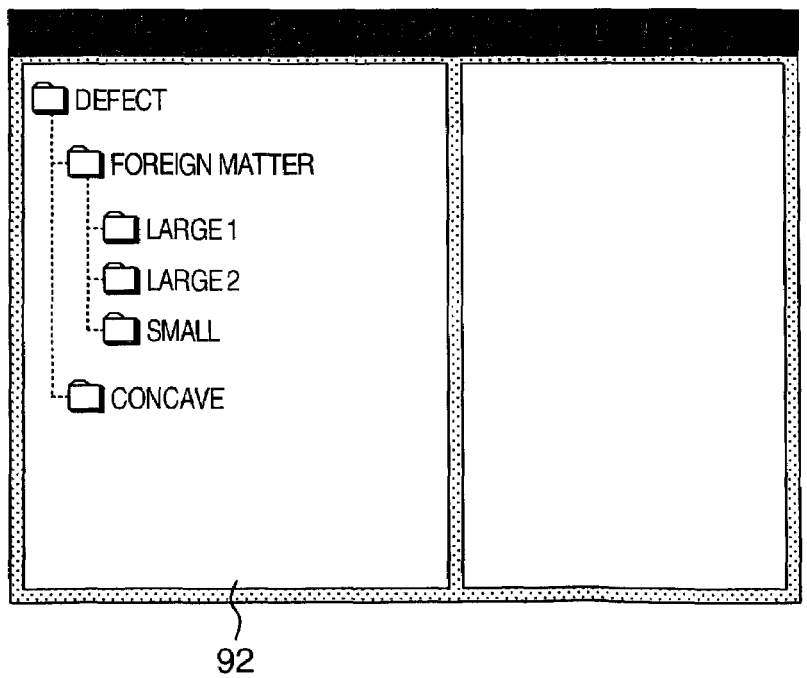

Operation 4: Division of Class (FIGS. 9A-9B)

In some classifying criteria, the degree of sub-division may be changed by the user. For example, the classifying criterion of "large•small" may be changed from two classes to more than two classes (three classes of "large•middle•small"). As shown by 91 in FIG. 9A, the operating procedure is, for example, such that after selecting the class to be divided, the user may get the operation panel to be displayed, and then do the sub-divide operation. 92 in FIG. 9B shows the state in which the subordinate class "large" of the "foreign matter" has been sub-divided into "large 1" and "large 2".

Figure 10A:
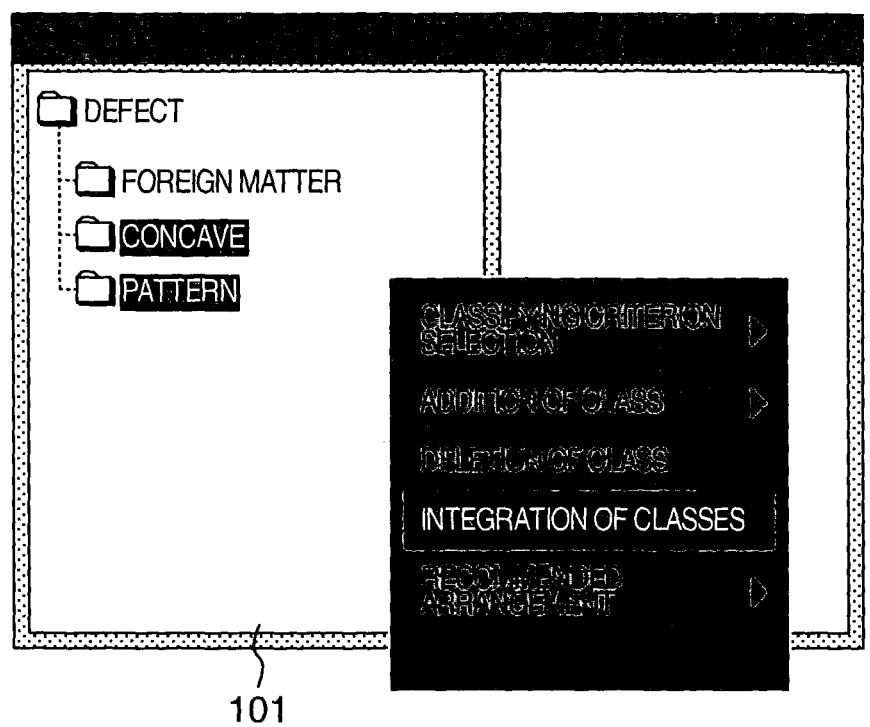
FIGS. 10A and 10B are elevation views showing a screen on which a class arrangement is specified, for explaining the procedure of combining classes.
Figure 10B:
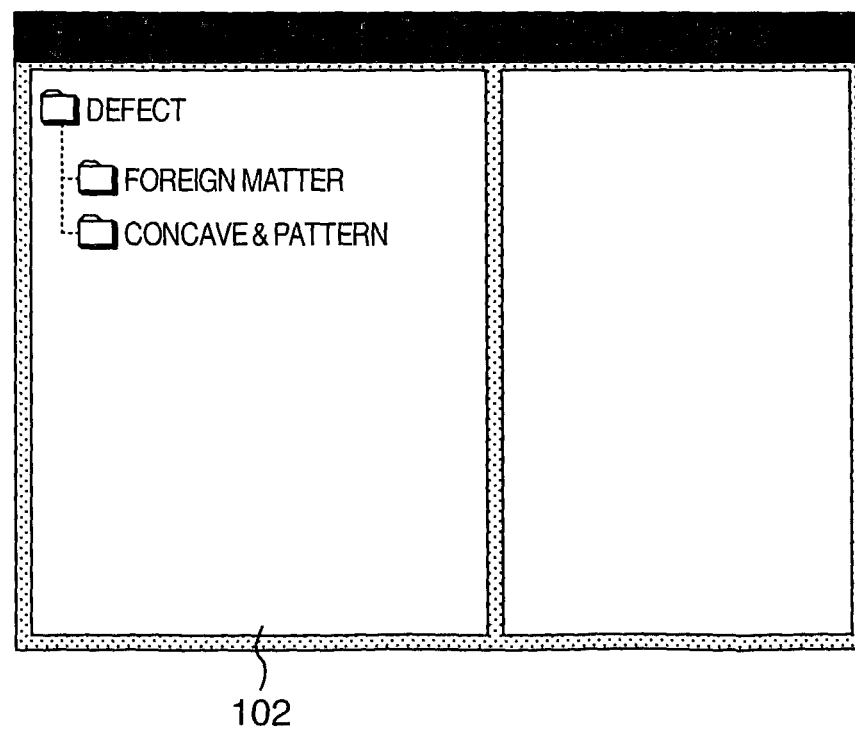

Operation 5: Integration of Classes (FIGS. 10A and 10B)

In order to avoid unnecessary sub-division, the user may integrate two or more classes. For example, as indicated by 101 in FIG. 10A, the integrating operation may be executed such that after selecting the classes to be integrated, the user may get the concerned operation panel to be displayed, and do the integration operation. FIG. 10B shows by 102 the result of integration of "concave" and "pattern defect".

(2) Automatic Adaptation of Classifier

Description will now be made to the method for causing the system to automatically adapt the classifying rule to the class arrangement defined by the user.

The system has the initial state of the classifying rule built in for each classifying class. Herein, the initial state of the classifying rule is defined as the border between the feature amount space composed of a preferable feature amount to realize each classifying criterion and the class of the feature space, for each classifying criterion. One example is illustrated in FIGS. 11A-11C.

Figure 11A:
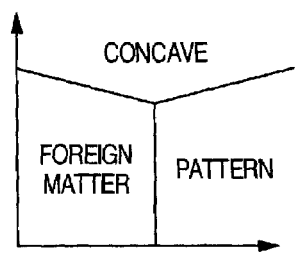
FIGS. 11A to 11C are views for explaining a space of a feature amount corresponding with a classifying criterion.
Figure 11B:
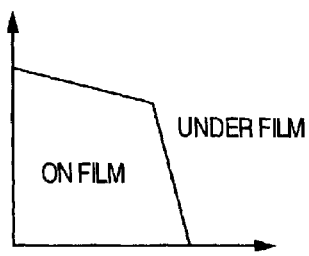
Figure 11C:
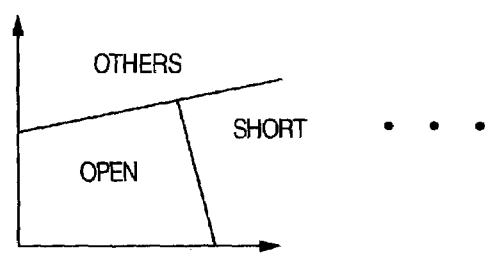

FIGS. 11A to 11C show three classifying criteria, that is, "foreign matter/concave/pattern", "on film/under film", and "open/short/others", and the feature amount spaces corresponding thereto. Each of the feature amount spaces is divided into areas uniquely corresponding to respective classes belonging to each classifying criterion.

The foregoing description is directed to the setting procedure for specifying the class arrangement. For facilitating the operation, a recommended class arrangement may be built in advance, and then if required by the user, the recommended class arrangement built therein may be selected.

Now, description will be directed to the method for adapting the classifying rule in the initial state into each foregoing operation of specifying the class arrangement.

Operation 1: Selection of Classifying Criterion

The selection of the classifying criterion means the use of the feature amount space for the selected classifying criterion.

Operation 2: Deletion of Class

If the class was deleted, two adaptations of the classifying rule may be available.

(1) Automatic Detection and Annulment of Redundant Feature

With the annulment of the class, the feature space may often become redundant. For example, it is assumed that the classifying rule for classifying defects into "foreign matter", "concave", and "pattern" uses the feature amount 1 and the feature amount 2 in the initial state and that whether or not the defect is classified into the "pattern" is identified only by the feature amount 2. If the user deleted the class "pattern", the feature amount 2 becomes redundant in the two classes of "foreign matter" and "concave".

In the automatic adaptation of a classifying engine, consistency of the classifying rule is checked and then the redundant feature like the feature amount 2 is automatically detected and deleted.

(2) Automatic Full Preparation of Feature Space

Figure 12A:
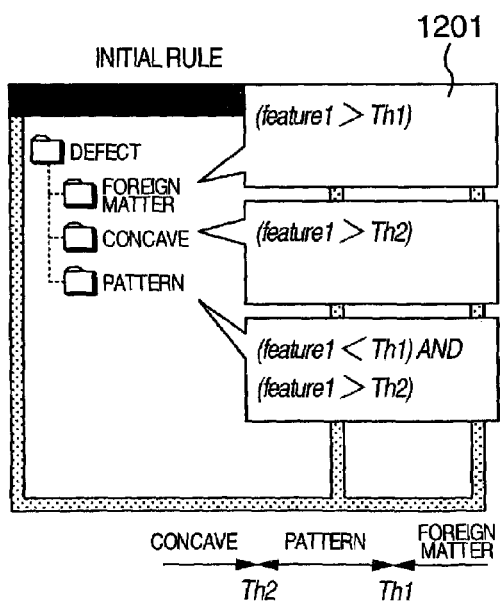
FIGS. 12A and 12B are elevation views showing a screen on which a class arrangement is specified, for explaining automatic adaptation of the classifying rule accompanied with class deletion.

In some cases, it becomes necessary to redefine the classification of the area that has been classified into a deleted class into another class. FIG. 12A shows the initial state of the classifying rule for each class when the "foreign matter", "concave", and "pattern" are selected as the classifying criteria. That is, in the classification of the "foreign matter", "concave", and "pattern", the feature amount space is a one-dimensional space with the feature 1 as the axis. In the initial state of the classifying rule, one of the foregoing three classes corresponds to any value of the feature 1.

Figure 12B:
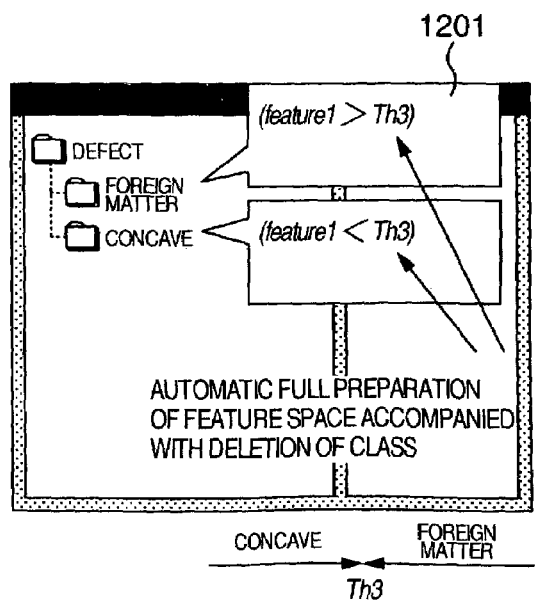

Assuming that the class "pattern" is deleted as shown in FIG. 12B, the "empty area" that does not correspond to any class takes place in the feature amount space.

In the automatic adaptation of the classifying engine, such "empty area" in the feature amount space is automatically detected and then allocated to another class. For example, the closest class may be allocated to each point of the empty area. Alternatively, how to allocate the class to the empty area may be built in advance, or may be learned with the use of the teach data.

Operation 3: Definition of Hierarchy

When a hierarchical relation is defined, the classifying rule in the subordinate class succeeds that of the superordinate class. More specifically, it is assumed that classifying rule groups Ra and Rb are defined for the classes A and B, respectively. It means that if Ra (Rb) is established or holds true, it is classified into the class A (B). Herein, assuming that the class B is set to be subordinate to the class A, the classifying rule of the class B is classified into the class B if Ra and Rb are established or hold true.

Operation 4: Division of Class

A class may be divided for specific classifying criteria, such as largeness, brightness, and height of a defect. The dividing border may be set on the concerned screen shown in FIG. 3 by the user or using the teach data.

Operation 5: Integration of Classes

When some classes are integrated, the area for the integrated class may be equivalent to a sum of the areas for the classes to be integrated in the feature amount space. In other words, assuming that the corresponding classifying rule groups Ra and Rb are defined for the classes A and B, the classifying rule for the class resulted from the integration of the classes A and B corresponds to Ra or Rb.

In the description of the third embodiment above, the method for combining the classes supplied by the system with the classes defined by the user to define a new class arrangement is explained. Further, the method for automatically rearranging the classifying rule about the class having the initial value of the classifying rule built in the defined class arrangement is explained.

Now, description will be made to a fourth embodiment of the present invention. In this embodiment, under the class arrangement specified by the user, the classifier is adapted by relearning a default set of teach data built in the system.

Description will be made to adaptation of the classifier according to the fourth embodiment with reference to FIGS. 13A-13C. The system has teach data which has been built therein in advance as default teach data. Each teach data item is assigned a correct answer in each classifying criterion built in the system as indicated by 1301 in FIG. 13A.

FIGS. 13B and 13C show by 1302 and 1303 the class arrangements set by the user, respectively. In the arrangement 1302 shown in FIG. 13B, the system automatically learns the teach data (1) and (3) indicated by 1301 in FIG. 13A as the teach data of the "foreign matter: large" class and the teach data (2) and (4) as the "foreign matter: small" class. In the arrangement 1303 shown in FIG. 13C, the system automatically learns the teach data (1) and (2) indicated by 1301 in FIG. 13A as the "foreign matter: on film" class and the teach data (3) and (4) as the "foreign matter: under film" class. As described above, by relearning the built-in default teach data for the class arrangement specified by the user, the classifier is automatically adapted.

As described above, the teach data built in the system makes it possible to automatically classify the defects, making it unnecessary for the user to collect new teach data. Further, for the recommended class arrangement supplied by the system, learning may be executed using built-in teach data before shipping.

Moreover, a plurality of teach data sets may be prepared. Concretely, at first, a set of teach data may be built in the system for, for example, each of a wiring process, a gate process, a hole process, a capacitor process and so on. Then, the user specifies a teach data set to be used for learning after defining the class arrangement. The user can use teach data close to each requested classification so that classification may be made with higher reliability.

Figure 14:
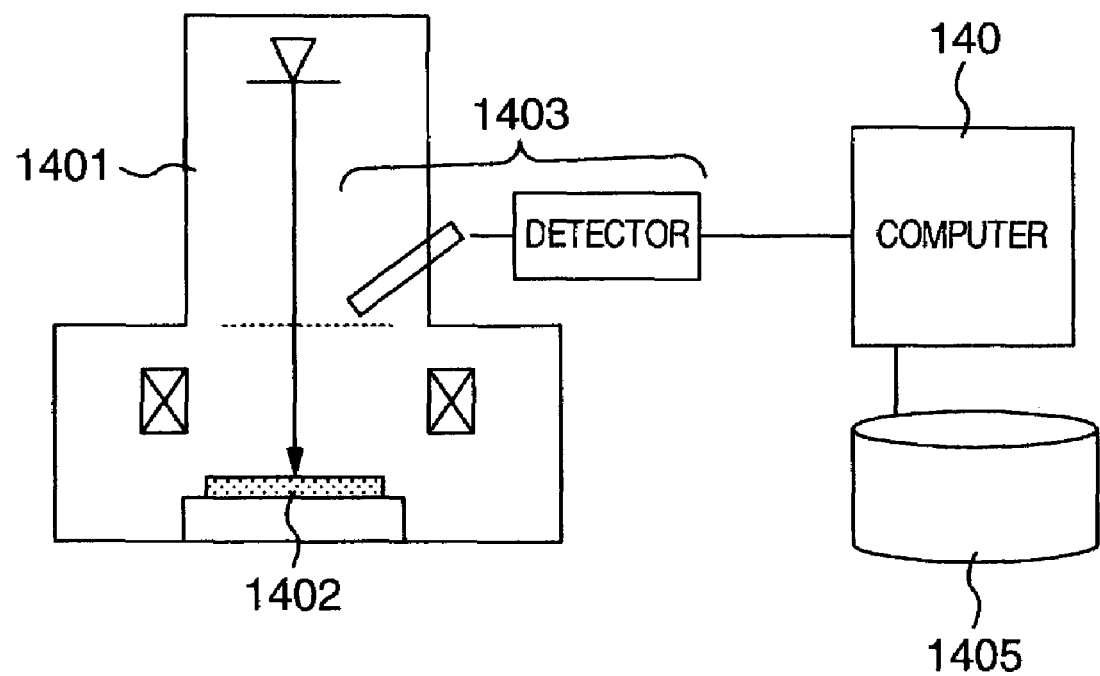
FIG. 14 is a block diagram showing a schematic arrangement of a system for detecting defects and classifying them according to the present invention.

Next, FIG. 14 schematically shows a construction of the system for detecting defects and classifying them according to the present invention. Reference number 1401 denotes an electron-irradiating optical system, which operates to irradiate an electron beam to defects occurring on a semiconductor electronic circuit substrate 1402 to be inspected. The secondary electrons emitted from the surface of the substrate 1402 are detected through an electron detector 1403 for forming an image. The detected electrons are converted into an electric signal and then the electric signal is converted into a digital image. The digital image is transferred to a computer 1404. The computer 1404 stores the detected electron image in a storage unit 1405. The computer 1404 compares the detected electron image with a reference image and calculates a difference image based on the compared result, from which difference image a defect is extracted. Then, the feature amount in the extracted defect is calculated and then is stored in the storage unit 1405. The computer 1404 presents the screens for setting described with respect to the first to the fourth embodiments to the user, for prompting the user to classify the defect.

The user specifies the class arrangement through the methods described in connection with the first to the third embodiments. Then, the user causes the classifier mounted in the computer 1404 in the form of software to learn the teach data as required. This makes it possible to automatically classify an image of the defect occurring on the semiconductor electronic circuit substrate.

The foregoing description is made with respect to the first to the fifth embodiments. In any of these embodiments, the user may newly add the teach data for the purpose of additional teaching.

Further, as another embodiment, in place of the electron beam type image detector for detecting a defect and classifying an image of the defect according to the fifth embodiment, an optical image detector may be used for classifying the image of the detected defect.

Further, the defect classification may be executed on the output information (composed of image information and composition information) of the electron beam type or optical image detector or an X-ray spectroscope for detecting an X-ray spectral characteristic.

While the present invention has been described in detail with reference to the application of the invention to classifying the image of the defect occurring on semiconductor electronic circuit substrates, the application of the invention is not limited to the above. For example, it may be applied to methods for automatically classifying the image of a defect occurring on the surfaces of a printed circuit board, an FPD, a liquid crystal display substrate, and so forth.

The present invention makes it possible to always realize highly reliable classification to various kinds of user requests. Unlike the rule-based classifier having a classifying rule built therein that correspond to a classifying class, the present invention allows a classifying rule to be adapted to each user by learning.

Moreover, the present invention also makes it possible to avoid lowering of a classifying performance with respect to data which are not teach data. More specifically, in learning a classifying rule for each class, the inventive system provides a priori knowledge of the user as a restriction and learns the rule under restriction. Hence, unlike ordinary learning classifiers, the learning under restriction allows the excess learning of the teach data to be avoided, thereby suppressing lowering of the performance in classifying data which are not teach data.

Further, the invention can provide the same advantages as those of the rule-based classifier and the learning classifier. That is, like the rule-based classifier, the present invention may be used at once under the state under which teach data is not present at all or is only barely present. Further, like the learning classifier, the inventive system can flexibly cope with the class arrangement requested by the user and allows the classifying performance to improve by learning teach data.

The invention may be embodied on other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for classifying defects with a classification system including a computer and imaging apparatus, the method comprising steps of:

obtaining with the imaging apparatus a defect image of a defect present in a sample;

calculating with the computer feature amounts of said defect from said defect image;

classifying said defect image with the computer into one of a plurality of classes based on said feature amounts and specified classification criteria to obtain a classification result of said defect image; and displaying said classification result of said defect image, wherein said specified classification criteria are specified by the following steps:

selecting a set of classification criteria from a plurality of classification criteria displayed at the classification system, the set of classification criteria being associated with a predetermined classifying rule stored at the computer, modifying a class arrangement of the classification system based on input from a user by performing at least one of deleting, dividing or integrating the selected set of classification criteria with respect to the class arrangement, and adapting the classifying rule automatically in response to the modified class arrangement so as to avoid an empty area in a feature space of the classification system corresponding to the classifying rule.

2. A method for classifying defects as claimed in claim 1 wherein said step of defining classification criteria includes arbitrarily combining predetermined classes.

3. A method for classifying defects as claimed in claim 1, wherein said step of assigning includes:

displaying said sample defect image on a display screen;

displaying said classes for classification on said display screen; and specifying, on said display screen on which said sample defect images and said classes for classification are displayed, classes for classification that are to be associated with corresponding respective sample defect images.

4. A method for classifying defects as claimed in claim 1, further comprising a step of receiving, at the computer, a restriction condition to be given to a value of said feature amount, said restriction condition being specified by the user and corresponding to the information displayed at the classification system.

5. A method for classifying defects as claimed in claim 1, wherein in said step of classifying said defect image, a classifier is used comprising a rule-based classifier or a learning classifier or a combination thereof.

6. A method of classifying defects with a classification system including a computer and imaging apparatus, comprising:

establishing a plurality of user-defined defect categories by altering a class arrangement of the classification system in response to a user input, wherein the user input directs at least one predetermined category of the classification system to be deleted, divided or integrated with respect to other predetermined categories of the classification system;

detecting a void in a feature space of the classification system based on the altered class arrangement;

updating classification rules associated with the plurality of user-defined categories to eliminate the void;

obtaining from a storage unit of the computer learning samples representative of defects occurring on a substrate;

for each defect category in the plurality of user-defined defect categories:
- associating one or more of the learning samples with the defect category,
- restricting at least one feature amount of the defect category in accordance with a corresponding user input, and
- training a classifier with the learning samples such that feature amounts of the learning samples not within a feature space determined by restricting the at least one feature amount of the defect category are ignored by the classifier;

obtaining with the imaging apparatus a defect image of a defect present on the substrate;

calculating with the computer feature amounts of the defect image corresponding to a feature space defined by the plurality of defect categories:

classifying with the computer the defect image into a target category based on the calculated feature amounts to obtain a classification result; and displaying at the classification system the classification result on a display screen, wherein the classification result indicates that the defect image corresponds to a region of the feature space defined by the learning samples and restrictions of the target category.

7. A method for classifying defects as claimed in claim 1, further comprising allocating the empty area to another class in the class arrangement of the computer.

8. A method for classifying defects as claimed in claim 7, wherein the empty area is allocated to a closest class in the feature space.

9. A method for classifying defects as claimed in claim 7, wherein the empty area is allocated based on learning with teach data.

10. A method for classifying defects as claimed in claim 1, further comprising:
- detecting a redundant feature in the feature space when the class arrangement is modified; and
- adjusting the feature space absent user input so as to delete the redundant feature.

11. A method for classifying defects as claimed in claim 6, further comprising allocating a region of the feature space corresponding to the void to another class in the class arrangement of the computer.

12. A method for classifying defects as claimed in claim 11, wherein the region is allocated to a closest class in the feature space.

13. A method for classifying defects as claimed in claim 11, wherein the region is allocated based on learning with teach data.

14. A method for classifying defects as claimed in claim 6, further comprising:
- detecting a redundant feature in the feature space based on the altered class arrangement; and
- adjusting the feature space absent user input so as to delete the redundant feature.

* * * * *